(12) United States Patent
Fourmigue

(10) Patent No.: US 8,877,400 B2
(45) Date of Patent: Nov. 4, 2014

(54) SOLID OXIDE FUEL CELL COMPRISING A THERMAL EXCHANGER PLACED CONCENTRICALLY RELATIVE TO A CELL CORE

(75) Inventor: Jean-François Fourmigue, Fontaine (FR)

(73) Assignees: Commissariat à l'Energie Atomique, Paris (FR); SNECMA, Paris (FR)

( * ) Notice: Subject to any disclaimer, the term of this patent is extended or adjusted under 35 U.S.C. 154(b) by 1031 days.

(21) Appl. No.: 12/442,119

(22) PCT Filed: Aug. 24, 2007

(86) PCT No.: PCT/FR2007/051837
§ 371 (c)(1),
(2), (4) Date: Mar. 20, 2009

(87) PCT Pub. No.: WO2008/034987
PCT Pub. Date: Mar. 27, 2008

(65) Prior Publication Data
US 2010/0021784 A1    Jan. 28, 2010

(30) Foreign Application Priority Data

Sep. 21, 2006  (FR) ..................................... 06 53886

(51) Int. Cl.
| H01M 8/02 | (2006.01) |
| H01M 8/04 | (2006.01) |
| H01M 8/06 | (2006.01) |
| H01M 8/10 | (2006.01) |

(52) U.S. Cl.
CPC ...... *H01M 8/04074* (2013.01); *H01M 8/04022* (2013.01); *Y02E 60/50* (2013.01)

USPC .......................... 429/440; 429/434; 429/495

(58) Field of Classification Search
USPC ................. 429/423, 434, 439, 440, 442, 495; 165/154, 164, 167, 169
See application file for complete search history.

(56) References Cited

U.S. PATENT DOCUMENTS

| 5,366,819 A | 11/1994 | Hartvigsen et al. |
| 5,573,867 A | 11/1996 | Zafred et al. |
| 6,024,859 A | 2/2000 | Hsu |
| 2004/0224196 A1 | 11/2004 | Pastula et al. |
| 2005/0089731 A1 | 4/2005 | Ogiwara et al. |
| 2007/0003806 A1 | 1/2007 | Sarkar et al. |

FOREIGN PATENT DOCUMENTS

| WO | WO-2004001873 | 12/2003 |
| WO | WO-2005057701 | 6/2005 |

OTHER PUBLICATIONS

European Patent Office, International Search Report, dated Jan. 17, 2008 (3 pages English Language Translation, 3 pages in French language).

*Primary Examiner* — Sean P Cullen

(57) ABSTRACT

Solid oxide fuel cell that comprises a cell core and a thermal exchanger suitable for supplying said cell core with a fluid at a given temperature required for its operation, wherein the exchanger comprises a cold fluid circuit and provides a thermal interface with a hot fluid circuit, the cold fluid circuit supplying the fluid inlet of the cell core and the hot fluid circuit being supplied by the fluid outlet of the cell core, characterized in that the thermal exchanger is provided concentrically relative to the cell core.

4 Claims, 1 Drawing Sheet

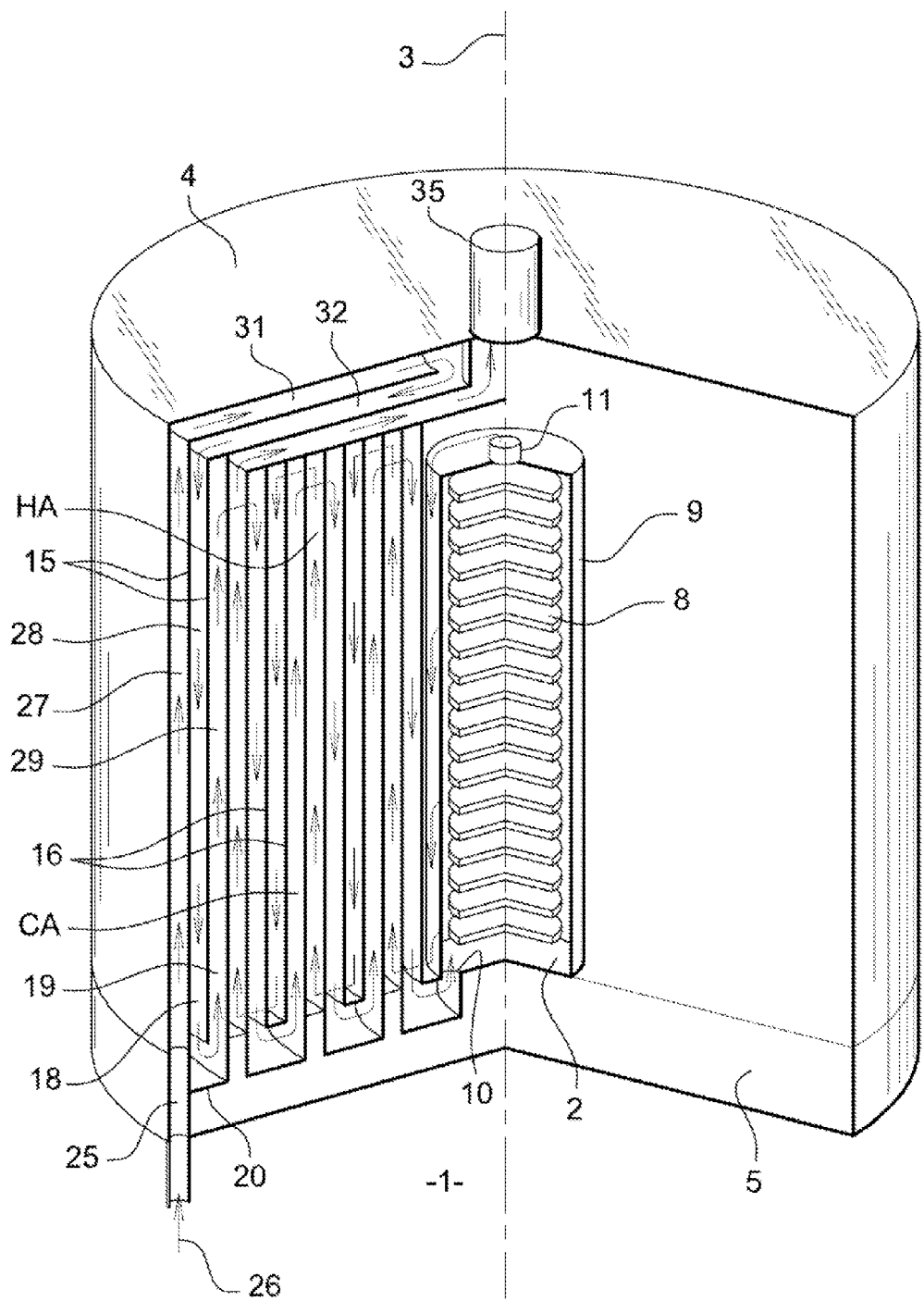

SOLID OXIDE FUEL CELL COMPRISING A THERMAL EXCHANGER PLACED CONCENTRICALLY RELATIVE TO A CELL CORE

CROSS REFERENCE TO RELATED APPLICATIONS

This application is a National Stage filing under 35 U.S.C. §371 of PCT Application No. PCT/FR2007/051837, filed Aug. 24, 2007. This application also claims the benefit of French Application No. 0653886, filed Sep. 21, 2006. The entirety of both applications is incorporated herein by reference.

BACKGROUND OF THE INVENTION

The invention relates to the field of fuel cells, and more specifically solid oxide fuel cells, commonly known as SOFC. The invention relates more specifically to an integrated cell design, optimized in terms of thermal exchanges in relation to the gaseous fluid required to maintain the chemical reaction occurring at the fuel core.

SUMMARY OF THE INVENTION

Solid Oxide Fuel Cells (or SOFC) make use of a chemical reaction which converts oxygen into $O^{2-}$ ions. In practice, this oxygen is supplied by causing an air flow to circulate inside a cell core which comprises a plurality of plates that form ceramic electrodes separated by an electrolyte.

To operate properly, the electrodes and the fuel core assembly must be brought to a high temperature, of about 900 to 1,000° C. Appropriate, typically electric, devices are used to keep up the temperature at the fuel core. To the same end, the air containing the oxygen which is supplied to the cell core must also be routed at a high temperature, close to the stated operating temperature.

Thus, conventionally, to keep the temperature high within the cell core, the latter is installed in a thermal enclosure comprising a highly insulating wall. Moreover, the air supplied to the cell core is pre-heated by an appropriate device, which can bring it to the required temperature so that the cell core can operate properly.

In practice, for safety reasons, the temperature outside the enclosure insulating and enclosing the cell core must not go above 60° C. It may be imagined that constraints of this kind compel the use of very thick insulating layers to make the thermal enclosure of the cell core. Said design thus involves a significant space requirement and very high levels of complexity.

Solutions have already been put forward with the aim of improving the construction of this type of cell. Thus, in the document US 2004/224196, a cell is described which comprises an exchanger and a reformer arranged in combination with the cell core, the assembly being enclosed in a thermal enclosure. The need persists for the wall of this enclosure to be of significant thickness, with consequences in terms of overall space requirement and cost.

Furthermore, in the document US 2005/0089731, a cell has been described which includes within a single enclosure the cell core and the exchanger allowing the air to be brought to a satisfactory temperature for the cell core to operate. To be more precise, said heating occurs inside an exchanger in which the cold air being fed into the cell core is heated by the hot air emerging from it.

The cell core and exchanger assembly are placed inside an enclosure which must be thermally highly insulating, and which therefore has the aforementioned drawbacks.

The objective of the invention is to restrict the space requirement of the cell enclosure, including therefore the cell core, and also of the devices needed to raise the temperature of the air being supplied to the cell core.

DETAILED DESCRIPTION OF THE INVENTION

The invention therefore relates to a solid oxide fuel cell, which comprises in the conventional way a cell core inside which the electro-chemical reaction occurs and a thermal exchanger which supplies said cell core with a fluid comprising oxygen at a given temperature required for the cell core to operate.

This exchanger comprises a cold fluid circuit (i.e., a first fluid circuit) and provides a thermal interface with a hot fluid circuit (i.e., a second fluid circuit). The cold fluid circuit supplies the fluid inlet of the cell core and the hot fluid circuit is supplied by the fluid outlet of the cell core. In accordance with the invention, said cell is characterized in that the thermal exchanger is placed concentrically relative to the cell core. In other words, the cell core is covered by the exchanger for pre-heating the air which is supplied to the cell core.

In other words, the invention involves combining the cell core with the exchanger for pre-heating the air which is supplied to it. In this way, some of the energy dissipated when the cell core output air is cooled is used to heat the cold air which is to return to it, which improves the thermal efficiency of the overall facility.

Moreover, the thermal exchanger, placed concentrically around the cell core functions as a thermal enclosure, acting substantially like a bell-jar covering the cell core.

According to one inventive characteristic, all or part of the periphery of the exchanger can be formed by an initial portion of the cold fluid circuit. In other words, the cold air entering the exchanger is routed, just after it goes in, to the periphery of the exchanger, with the result that the peripheral temperature of the exchanger is substantially close to the ambient temperature.

In other terms, the presence of the cold air on the periphery of the exchanger gives an external wall temperature of the exchanger that is as close as possible to the air input temperature. In this way, the external part of the exchanger contributes to the thermal insulation, relative to the outside. It is therefore no longer necessary to employ a specific thermal enclosure, which is generally voluminous and expensive.

To advantage in practice, the exchanger may be generally cylindrical in shape, thereby matching the shape of the cell core, particularly when the unit cells and the electrodes conform in shape to a disc. In this configuration, the exchanger may thus comprise a plurality of substantially cylindrical and coaxial plates, which define between them hot and cold fluid circuits alternately connected in series.

In other words, these unit plates define fluid circuit portions which are alternated, so as to properly exchange heat between the two fluid circuits.

To ensure also that the exchanger assembly is well insulated relative to the outside, provision may be made for at least the first two cold fluid circuit portions, which are connected in series, to be juxtaposed at the periphery of the exchanger. In other words, unlike the central part of the exchanger in which the cold fluid circuit portions are alternated, the external part of the exchanger may comprise two or three successive cold fluid circuit portions, within which no thermal exchange therefore occurs, but which provides an insulating function relative to the outside.

BRIEF DESCRIPTION OF THE FIGURE

The method for implementing the invention, and the resulting advantages, will become fully clear from the following embodiment description, supported by the single appended FIGURE, which shows a basic perspective view of a cell in accordance with the invention from which a portion has been removed, so as to reveal the internal constitution of the assembly. Not all the elements required for a fuel cell to operate have been shown; instead only those features which are of significance in understanding the invention have been given.

DETAILED DESCRIPTION OF THE INVENTION

The fuel cell (1) shown in the single FIGURE is shown diagrammatically, and mainly comprises a cell core (2) located on the axis of revolution (3) of the assembly, over which is placed the characteristic exchanger (4), which covers the cell core (2) in the manner of a bell jar, with the assembly resting on a stand (5) that shuts off the enclosure so defined around the cell core (2).

In a simplified way, the cell core (2) comprises a set of stacked unit cells (8), enclosed inside a rigid cylindrical enclosure (9). This enclosure (9) has at its lowest level a cell core inlet (10) for an air circulation to enter. Fittings may be provided particularly in the upper part of this enclosure (9) for the outflow of this fluid whereof some of the oxygen it contains will have been consumed by the unit cells (8).

In accordance with the invention, the exchanger (4) for delivering the airflow to the cell core (2) comprises two different fluid circuits. These two circuits (CA, HA) are defined between plates (15, 16) generally cylindrical in shape, and coaxial. Between these different plates (15, 16) are thus defined portions of the two fluid circuits (CA, HA) which are arranged alternately, as is conventional in a plate exchanger.

The geometry, materials and other specific fittings can be provided, depending on the performance required.

The link between the different vertical portions of the two fluid circuits (HA, CA) although not shown, is made appropriately so as to limit pressure loss.

In their lower part, each of the channels (18, 19), of the cold fluid circuit (CA) for example, are connected in series by portions (20) made in the plate that forms the insulating base and bottom of the fuel cell assembly (1). This base (5) is bored through with an opening for a cold fluid inlet (25) for a gas fluid (26) to enter. In accordance with one characteristic of the invention, the cold fluid circuit portions (27, 28, 29) directly connected to the cold fluid inlet (25) are connected in series, and juxtaposed, without hot fluid circuit portions being sandwiched between them. The portions (27, 28) are connected in series by means of two portions (31, 32) that are found in the upper part of the exchanger. In this way, the fraction of the cold fluid circuit (CA) constituted by the different portions (27, 28, 29, 31, 32) have a relatively substantial length, and forms an area which is substantially at the temperature of the gas fluid (26). Thermal insulation of the inside of the exchanger is therefore achieved in this way.

Clearly, a multiplicity of geometries in relation to the connection areas between the different channels defined between the plates (15, 16) can be implemented, without departing from the inventive framework.

By way of example, the cold fluid circuit may receive the gas fluid (26) at an ambient temperature, which may reach 60° C. This gas fluid (26) passes through the exchanger to reach a temperature of about 650° C. at the cell core inlet (2) (10). The hot air leaving the cell core (2) at the cell core outlet (11) is at a temperature of about 900° C., and its temperature drops as it is routed in the hot fluid circuit, to end up, in the outlet pipe (35), at around 500° C.

It is clear from what has been said above that the inventive fuel cell has the major advantage of combining in a single structural component the cell core with the thermal exchanger that pre-heats the air that supplies oxygen to the cell core.

This air is heated by the air coming from the cell core, with the result that the heat balance of the overall facility is improved.

Additionally, the exchanger, given its location and its constitution, acts as a thermal enclosure around the cell core, thereby reducing the complexity and overall space requirement of the facility.

The invention claimed is:

1. A solid oxide fuel cell, comprising:
 a cell core comprising a fluid inlet and a fluid outlet;
 a thermal exchanger;
 a first fluid circuit provided in said thermal exchanger, the first fluid circuit supplying the fluid inlet;
 a second fluid circuit provided in said thermal exchanger, the second fluid circuit being supplied by the fluid outlet,
 wherein a central part of the thermal exchanger comprises a plurality of substantially cylindrical plates which are coaxially arranged with one another and are placed concentrically relative to the cell core, and
 wherein each of said plurality of substantially cylindrical plates provides a thermal interface between one portion of the first fluid circuit and one portion of the second fluid circuit, such that plural portions of the first fluid circuit and plural portions of the second fluid circuit are connected alternately in series.

2. The fuel cell as claimed in claim 1, wherein the thermal exchanger is generally cylindrical in shape.

3. The fuel cell as claimed in claim 1, wherein the thermal exchanger further comprises a periphery, all or part of the periphery formed by an initial portion of the first fluid circuit.

4. The fuel cell as claimed in claim 1, wherein the thermal exchanger further comprises a periphery, the periphery comprising at least one substantially cylindrical plate, wherein two portions of the first fluid circuit connected in series are juxtaposed about the substantially cylindrical plate of the periphery.

* * * * *